(12) United States Patent
Thiem et al.

(10) Patent No.: US 9,976,029 B2
(45) Date of Patent: May 22, 2018

(54) METHOD FOR THE PRODUCTION OF ABS COMPOSITIONS HAVING AN IMPROVED SURFACE

(71) Applicant: Covestro Deutschland AG, Leverkusen (DE)

(72) Inventors: Hans-Juergen Thiem, Dormagen (DE); Ingmar Hermsdorfer, Krefeld (DE); Birgit Mannel, Muelheim an der Ruhr (DE); Andreas Seidel, Dormagen (DE); Eckhard Wenz, Cologne (DE); Hans-Juergen Klankers, Leverkusen (DE)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 146 days.

(21) Appl. No.: 14/764,619

(22) PCT Filed: Feb. 5, 2014

(86) PCT No.: PCT/EP2014/052257
§ 371 (c)(1),
(2) Date: Jul. 30, 2015

(87) PCT Pub. No.: WO2014/122177
PCT Pub. Date: Aug. 14, 2014

(65) Prior Publication Data
US 2015/0368463 A1    Dec. 24, 2015

(30) Foreign Application Priority Data

Feb. 7, 2013  (EP) .................................... 13154459

(51) Int. Cl.
| | |
|---|---|
| *C08L 69/00* | (2006.01) |
| *C08F 2/22* | (2006.01) |
| *C08F 6/00* | (2006.01) |
| *C08F 6/28* | (2006.01) |
| *C08K 3/00* | (2018.01) |
| *C08L 55/02* | (2006.01) |
| *C08L 67/00* | (2006.01) |
| *C08J 3/00* | (2006.01) |
| *C08J 3/22* | (2006.01) |

(52) U.S. Cl.
CPC ................ *C08L 69/00* (2013.01); *C08F 2/22* (2013.01); *C08F 6/008* (2013.01); *C08F 6/28* (2013.01); *C08J 3/005* (2013.01); *C08J 3/226* (2013.01); *C08K 3/00* (2013.01); *C08L 55/02* (2013.01); *C08L 67/00* (2013.01); *C08L 69/005* (2013.01); *C08J 2369/00* (2013.01); *C08J 2425/12* (2013.01); *C08J 2455/02* (2013.01); *C08L 2205/02* (2013.01); *C08L 2205/025* (2013.01); *C08L 2205/035* (2013.01); *C08L 2207/04* (2013.01)

(58) Field of Classification Search
CPC .......... C08L 67/00; C08L 55/02; C08L 69/00; C08L 69/05; C08F 2/22; C08F 6/08; C08F 6/28; C08K 3/105
USPC ........................................................ 524/504
See application file for complete search history.

(56) References Cited

U.S. PATENT DOCUMENTS

| | | | |
|---|---|---|---|
| 5,314,990 A | 5/1994 | Jansen et al. | |
| 6,187,825 B1 | 2/2001 | Guntherberg et al. | |
| 6,284,830 B1 | 9/2001 | Gottschalk et al. | |
| 6,890,979 B2 | 5/2005 | Eichenauer et al. | |
| 8,481,630 B2 | 7/2013 | Fischer et al. | |
| 8,680,201 B2 | 3/2014 | Seidel et al. | |
| 8,927,621 B2* | 1/2015 | Seidel | C08L 55/02 264/259 |
| 9,714,324 B2* | 7/2017 | Thiem | C08J 3/005 |
| 2013/0281595 A1 | 10/2013 | Seidel et al. | |
| 2015/0065623 A1 | 3/2015 | Seidel et al. | |

FOREIGN PATENT DOCUMENTS

| | | |
|---|---|---|
| DE | 2021398 A1 | 11/1970 |
| DE | 2815098 A1 | 10/1978 |
| DE | 202004017275 U1 | 11/2005 |
| DE | 102004053929 A1 | 5/2006 |
| DE | 102005022632 A1 | 11/2006 |
| DE | 102006011074 A1 | 9/2007 |
| DE | 102006056523 A1 | 6/2008 |
| EP | 0893479 A1 | 1/1991 |
| EP | 459161 A2 | 12/1991 |
| EP | 2072203 A1 | 6/2009 |
| EP | 2657258 A1 | 10/2013 |
| EP | 2657259 A1 | 10/2013 |
| JP | 2010110935 A | 5/2010 |
| WO | 9828344 A1 | 7/1998 |
| WO | 0166640 A1 | 9/2001 |
| WO | 2008020012 A2 | 2/2008 |
| WO | 2008090674 A1 | 7/2008 |
| WO | 2009071537 A2 | 6/2009 |
| WO | 2010052872 A1 | 5/2010 |
| WO | 2010094416 A1 | 8/2010 |

OTHER PUBLICATIONS

International Search Report from corresponding PCT/EP2014/052257, dated May 27, 2014.

* cited by examiner

*Primary Examiner* — Edward J Cain
(74) *Attorney, Agent, or Firm* — K&L Gates LLP

(57) ABSTRACT

The invention relates to a method for producing compositions containing vinylaromatic copolymers which are obtained in an emulsion polymerization process and comprise production-related salt inclusions. Said compositions are characterized by an improved surface quality once the extruded polymer, before being granulated, or the granulate, after being granulated, has been moistened by bringing the polymer in contact with liquid water in a water bath, a tube system filled with water, or a dipping tank, thus making the compositions suitable for producing molded articles having a class A surface that remains flawless over time.

25 Claims, No Drawings

METHOD FOR THE PRODUCTION OF ABS COMPOSITIONS HAVING AN IMPROVED SURFACE

CROSS REFERENCE TO RELATED APPLICATIONS

This application is a § 371 National Stage Application of PCT/EP2014/052257, filed 5 Feb. 2014, which claims priority to EP 13154459.5, filed 7 Feb. 2013.

BACKGROUND

Field of the Invention

The present invention relates to a process for producing compositions comprising vinylaromatic copolymers which have been produced in a emulsion polymerization process and have production-related salt inclusions, which feature improved surface quality after the polymer strands prior to pelletization or the pellets after the pelletization have been moistened by contact with liquid water in a water bath, a water-filled pipe system or a dip bath and, after removal of water not adhering to the pellet surface, have been stored under surface-moist conditions for a defined period, and then melted and kneaded. These compositions are particularly suitable for production of shaped bodies having an aging-stable defect-free class A surface. The present invention additionally relates to the compositions produced by the process according to the invention and to the use thereof for production of shaped bodies compliant with class A surface requirements and having a partial or full high-gloss finish, which may optionally be subjected partly or fully to a further surface treatment step by, for example, painting, in-mold coating of films, metalization via vacuum deposition or electroplating.

Description of Related Art

Compositions comprising vinylaromatic copolymers prepared by the emulsion polymerization process, and containing production-related salt inclusions, are known from the literature. Sources of such production-related salt inclusions are manifold, for example emulsifier solutions, polymerization initiator solutions, buffer solutions and precipitant solutions which are used as auxiliaries in the emulsion polymerization process, and which, depending on the process, remain in the material or else are removed again from the material only incompletely in the course of workup of the polymer. Especially the precipitation of vinyl polymer latices produced in emulsion polymerization which is generally conducted in conventional processes, as, for example, in EP 459 161 B1, DE 2 021 398 and DE 28 15 098, by means of addition of acids and/or salts makes a considerable contribution to the salt burden of the final polymer, since these salts can generally be removed from the product again by downstream process steps (washing) only insufficiently or with a high level of cost and inconvenience (energy and water/wastewater). Coagulants used are, for example and with preference, aqueous solutions of water-soluble salts, for example alkali metal, alkaline earth metal or aluminum chlorides, alkali metal, alkaline earth metal or aluminum sulfates, alkali metal, alkaline earth metal or aluminum nitrates, alkali metal, alkaline earth metal or aluminum phosphates, alkali metal, alkaline earth metal or aluminum acetates, alkali metal, alkaline earth metal or aluminum formates, alkali metal, alkaline earth metal or aluminum aluminates or alkali metal, alkaline earth metal or aluminum carbonates, more preferably aluminum chloride, calcium chloride and magnesium sulfate solutions, optionally in combination with inorganic or organic acids, for example hydrochloric acid, sulfuric acid, phosphoric acid, boric acid, formic acid, acetic acid, propionic acid and citric acid.

The literature states that such salt inclusions in compositions comprising vinylaromatic copolymers can lead to undesirable effects.

By way of example, WO 2009/071537 discloses that magnesium compounds and/or calcium compounds in impact-modified vinylaromatic copolymers selected from the group of the acrylonitrile-butadiene-styrene copolymers (ABS), acrylonitrile-styrene-acrylate-copolymers (ASA) and methacrylate-acrylonitrile-butadiene-styrene copolymers (MABS), optionally comprising polycarbonate and additives, lead to undesirable deposit formation on the shaping mold in the course of thermoplastic shaping via injection molding or extrusion, and in that respect claims compositions of this type having a content of magnesium compounds and/or calcium compounds of 0 mg/kg to 100 mg/kg. The emulsion polymers used in said compositions are usually precipitated by freeze precipitation in a flake ice machine, rather than by the conventional addition of magnesium sulfate solution.

WO 98/28344 discloses a process for continuous coagulation of aqueous dispersions of graft rubbers via shear, which overcomes the known disadvantage of precipitation by means of acids and/or salts as coagulants, in that contaminants often remain in the polymers after workup, and these can lead to impairment of product properties.

One problem with thermoplastic compositions comprising vinylaromatic copolymers prepared by the emulsion polymerization process with production-related salt inclusions is that when moldings produced from these are exposed to moisture (for example condensation or humidity), particularly at elevated temperatures, they are susceptible to undesirable development of surface defects (blistering), which restrict the use of compositions of this type in moldings with a high-gloss finish and those compliant with Class A surface requirements.

EP 2 398 842 A1 discloses a compounding process for production of impact-modified polycarbonate compositions having a reduced content of volatile organic compounds, in which 2% to 40% by weight, based on the sum total of impact modifier and water, of liquid water is added to the pulverulent graft polymer used as impact modifier and the preliminary mixture thus prepared is used in the compounding of the impact-modified polycarbonate compositions. This process corresponds to a comparative example in this application.

In JP2010110935, pellets are mixed with water, with the aim of removing dust/or fines fractions from the pellets. By means of a porous body, the water is subsequently removed again. WO2010052872 likewise describes the mixing of pellets for surface cleaning of the pellets. However, these procedures do not enable a treatment in accordance with the invention.

EP2072203 describes the treatment of pellets with water for the purpose of removing residual monomers. For this purpose, the pellets are boiled in water or other liquids for 15 min to 6 h, in order to remove residual monomers.

WO2008090674 discloses a method for cooling PC pellets after strand pelletization. Downstream of a pelletizer, there is a second cooling step in water with a given temperature profile.

DE102004053929 and DE202004017275 describes thermal treatment following underwater pelletization. Pellets are mixed together with cooling water once more after pelletization and centrifuge, and then dried in a drier.

SUMMARY

The problem addressed by the present invention was thus that of providing an improved process which allows the production of thermoplastic compositions comprising vinylaromatic copolymers which have been produced in an emulsion polymerization process, have production-related salt inclusions, and feature improved surface quality after storage under warm and moist conditions and in this respect are suitable for production of shaped bodies having an aging-stable, visually defect-free class A surface.

"Visually defect-free class A surfaces" in the context of present invention means surfaces which do not have blisters in a number and diameter unappealing to the naked eye. Preferably, such "visually defect-free class A surfaces" have a relative area of defects having blister topography, based on the surface size examined ($A_{rel}$), of less than 50 ppm, preferably of less than 30 ppm, more preferably of less than 20 ppm.

In addition, these surfaces, in a preferred embodiment, after a treatment under warm and moist conditions (condensation water test according to DIN EN ISO 6270-2, test duration 72 h), have no blisters having a diameter greater than 300 μm.

Such visually defect-free class A surfaces, however, nevertheless frequently have blisters visible with optical aids, for example a magnifying glass or microscope. The relative area of defects having blister topography, based on the surface size examined ($A_{rel}$), is preferably 0.1 to 50 ppm, more preferably 1 to 30 ppm, more preferably 3 to 20 ppm. The maximum defect size, i.e. the diameter of the largest defects having blister topography found on such visually defect-free class A surfaces, is preferably within a range from 10 μm to 300 μm.

It has now been found that, surprisingly, this problem is solved by a process for producing compositions comprising
A) 0 to 98 parts by weight, preferably 1 to 95 parts by weight, especially 30 to 85 parts by weight, based on the sum total of A and B, of a thermoplastic polymer or a mixture of a plurality of thermoplastic polymers different from B and
B) 2 to 100 parts by weight, preferably 5 to 99 parts by weight, more preferably 15 to 70 parts by weight, based on the sum total of A and B, of
  B1) at least one graft polymer prepared in an emulsion polymerization process,
  B2) optionally at least one graft polymer prepared by the bulk, suspension or solution polymerization process,
  B3) optionally at least one rubber-free vinyl (co)polymer and
C) 0 to 30 parts by weight, preferably 0.1 to 20 parts by weight, especially 0.3 to 7 parts by weight, based on the sum total on A and B, of at least one commercially available polymer additive,
where the sum total of parts by weight A and B is 100, and component B, preferably component B1 or a pre-compound composed of component B1 with at least one of components B2 and B3 or with a portion of at least one of components B2 and B3, more preferably a pre-compound composed of component B1 and the entirety or a portion of component B3, comprises at least one inorganic salt consisting of a cation selected from the group of the alkali metals, alkaline earth metals and aluminum and an anion selected from the group consisting of chloride, sulfate, nitrate, phosphate, acetate and formate, in a concentration of the salt or salt mixture of 100 to 5000 mg/kg, preferably of 150 to 2000 mg/kg, more preferably of 200 to 1000 mg/kg, based on the composition, characterized in that
a) in a first process step the entirety of the component(s) containing the salt from B, optionally together with a portion or the entirety of the remaining components from B, A and C is processed in a compounding system, preferably an extruder, to give a polymer blend melt, then this polymer melt is discharged from the extruder and, in the form of polymer strands prior to the pelletization or alternatively in the form of pellets after the pelletization, is contacted with water completely by contact with liquid water in a water bath, a water-filled pipe system or a dip bath,
b) in a second process step the pellets which have been contacted with water in this way are separated from water not adhering to the surface of the pellets and then are stored under surface-moist conditions,
c) in a third process step the pellets thus stored under moist conditions are melted and kneaded in the molten state and/or
d) in a fourth process step the component thus prepared is mixed with the remaining components of the composition, the mixture is melted again and kneaded, and the components of the mixture are interdispersed in this way.

DETAILED DESCRIPTION OF A PREFERRED EMBODIMENT

The internal moisture content is determined after surface pellet drying by means of Karl Fischer titration. The pellets are heated to a temperature of 80° C. to constant weight with an IR balance in order to remove the moisture adhering to the surface. The amount of water removed in this way, based on the pellet weight, is referred to as surface moisture content. Thereafter, the surface-dried pellets are subjected to a Karl Fischer titration. The internal moisture content refers to the amount of water which is determined by means of Karl Fischer titration based on the pellet weight. The total moisture content of a pelletized material corresponds to the sum total of internal moisture content and surface moisture content.

The storage of the surface-moist pellets in process step b) can be effected continuously or batchwise.

The contacting with liquid water in process step a) is effected in the temperature range from 5 to 95° C., preferably from 10 to 90° C., more preferably from 20 to 85° C.

There is an upper limit to the preferred ranges for the process temperatures in process steps a) and b) in that, above 85° C., the pellets have an increasing tendency to soften and as a result to conglutinate with increasing temperature, and hence the meterability thereof in the further process steps b) and optionally c) is adversely affected, or else further process steps are needed to bring the pellets back into a meterable form.

The residence time of the strands or the pellets in the water bath in process step a) is preferably between 1 second and 60 minutes, more preferably between 2 seconds and 10 minutes, most preferably between 3 seconds and 60 seconds.

The moistening can be effected in a water bath, as typically used for strand pelletization in extrusion or other compounding systems for solidification of the polymer melts prior to pelletization. The moistening can be effected in a water-filled pipe system, as typically used in underwater pelletization. The moistening can be effected in other apparatuses which are used for pelletization in contact with water. In an alternative embodiment, the moistening can also be effected on the pellets produced separately in a mixing apparatus, for example a tumble mixer. The moistening may, but need not, be effected directly after the production or processing in the molten state, for example in an extruder. After the moistening, the polymer strands can be pelletized, which is conducted in such a way that the strands remain moist.

The moistening is followed by a process step in which water not adhering to the surface is separated from the pellets. This can be effected, for example, by screening. The maintenance of a surface-wetted state is essential.

The amount of water in the surface-moist pellets, in a preferred embodiment, is at least 1% by weight, preferably at least 2% by weight, more preferably at least 3% by weight, based on the sum total of water and pellets, and not more than 30% by weight, preferably not more than 20% by weight, more preferably 10% by weight, based on the sum total of water and pellets.

The moistening is followed, in process step b), by a storage time in the surface-moist state. The pellets must not be surface-dried before or during this storage time. The storage can be conducted in a silo or in any container.

The mean storage time of the moist pellets in process step b) is at least 24 h, preferably at least 48 h, more preferably at least 72 h. At the same time, more preferably not more than 10% of the pellets experience a storage time of less than 72 h and not more than 1% of the pellets a storage time of less than 24 h. In the preferred embodiment, the mean storage time is not more than 1000 h, preferably not more than 700 h, more preferably not more than 500 h, most preferably not more than 200 h.

Preferably, the component(s) B containing the salt, or only the component B1 containing the salt, or the precompound containing the salt and composed of component B1 with at least one of components B2 and B3 or with a portion of at least one of components B2 and B3, is used in the form of pellets.

In a preferred embodiment, connected downstream of the storage is an apparatus for removing the surface water from the stored pellets. Such an apparatus may, for example, be a belt drier, a centrifugal drier, a fluidized bed drier or a flow drier, a drying cabinet or a shaft drier. A preferred embodiment is a centrifugal drier. In addition, there may be a downstream conveying operation, for example an entrained flow conveying operation with dry and/or heated air, for surface drying. This step assures easy transportability, storability and meterability of the pellets in downstream processing steps.

Further preferably, the water content of the pellets used in process step c) is 0.3% to 2.0% by weight, even further preferably from 0.5% to 1.8% by weight and more preferably from 0.6% to 1.6% by weight, based on component(s) B, or the respective sub-component(s) subjected to water contact. This moisture content is measured after surface drying of the pellets and therefore relates to the moisture content within the pellets.

"Pellets" in the context of the invention are understood to mean a component or a mixture composed of a plurality of components present in the solid state of matter. The size of the pellets is 2-5 mm, more preferably 2.5-4 mm. The pellet grains may be of any desired shape, for example lenticular shape, spherical shape or cylindrical shape.

"Powder" or "pulverulent" in the context of the invention is understood to mean a component or a mixture of a plurality of components which is in the solid state of matter and in which the particles have particle sizes of less than 2 mm, preferably of less than 1 mm, especially of less than 0.5 mm.

Optionally, there may be further steps between the moistening and compounding, for example for storage, dispensing, transport or the like.

In an alternative and preferred embodiment, the entirety or a portion, more preferably all, of components A and C and the residual amounts of component B are added to the composition at the early stage of process step (c) and interdispersed by the kneading operation, and the water introduced into the process in process step a) is removed again from the product by applying a reduced pressure of preferably at least 200 mbar, further preferably of at least 500 mbar, more preferably of at least 800 mbar.

In a last step e), the composition is generally subsequently cooled again and pelletized.

According to the invention, component B, preferably component B1, contains at least one inorganic salt consisting of a cation selected from the group of the alkali metals, alkaline earth metals and aluminum, and an anion selected from the group consisting of chloride, sulfate, nitrate, phosphate, acetate and formate.

Preferably, the salt is an alkali metal, alkaline earth metal or aluminum chloride or an alkali metal, alkaline earth metal or aluminum sulfate, or a mixture thereof; more preferably, the salt is selected from the group consisting of aluminum chloride, calcium chloride and magnesium sulfate, or mixtures thereof; most preferably, the salt is magnesium sulfate.

In a preferred embodiment, the composition consists only of the components A, B and C.

In another preferred embodiment, component B consists of at least two components selected from the group consisting of B1, B2 and B3, further preferably of components B1 and B3, more preferably of B1, B2 and B3.

The inorganic salt is preferably introduced via component B1 into the composition which preferably contains the salt as a production-related impurity. More preferably, the salt is present in component B1 in the form of production-related salt inclusions.

Component B, preferably component B1, contains the salt in a concentration of 100 to 5000 mg/kg, preferably of 150 to 3000 mg/kg, more preferably of 200 to 1500 mg/kg, based on the composition.

The content of inorganic salt is determined via the anion contents of chloride, sulfates, nitrate, phosphate, acetate or formate, preferably chloride or sulfate, more preferably sulfate. Such a determination is effected after suitable material digestion by ion chromatography via conductivity measurement according to the method described in the examples for determining the magnesium sulfate content.

What is advantageous in this process is firstly the simpler substantial, in preferred embodiments exclusive, handling of component B and constituents thereof in the form of pellets compared to powders, which have a tendency to stick and are also prone to explosion, and secondly also the possibility of using ABS in pellet form with a high production-related salt burden without further complex purification steps such as washing or melt filtration for production of class A surface components.

Component A

Useful components A in principle include all kinds of component B of various thermoplastic polymers or mixtures of two or more than two such thermoplastic polymers.

Examples include polyolefins (such as polyethylene and polypropylene), thermoplastic polyurethanes, polyacetals (such as polyoxymethylene and polyphenylene ether), polyamides, polyimides, polycarbonates, polyesters, polyester carbonates, polysulfones, polyarylates, polyaryl ethers, polyphenylene ethers, polyaryl sulfones, polyaryl sulfides, polyether sulfones, polyphenylene sulfide, polyether ketones, polyamide imides, polyether imides and polyester imides.

As component A, particular preference is given to using at least one polymer selected from the group consisting of polycarbonate, polyestercarbonate and polyester, particularly preferably at least one polymer selected from the group consisting of aromatic polycarbonate, aromatic polyestercarbonate and aromatic polyester, most especially preferably a polymer selected from the group consisting of aromatic polycarbonate and aromatic polyester carbonate.

Aromatic polycarbonates and/or aromatic polyestercarbonates in accordance with component A which are suitable in accordance with the invention are known from the literature or preparable by processes known from the literature (for preparation of aromatic polycarbonates see, for example, Schnell, "Chemistry and Physics of Polycarbonates", Interscience Publishers, 1964, and also DE-B 1 495 626, DE-A 2 232 877, DE-A 2 703 376, DE-A 2 714 544, DE-A 3 000 610, DE-A 3 832 396; for preparation of aromatic polyestercarbonates, for example DE-A 3 077 934).

Aromatic polycarbonates are prepared, for example, by reacting diphenols with carbonic halides, preferably phosgene, and/or with aromatic dicarbonyl dihalides, preferably benzenedicarbonyl dihalides, by the interfacial process, optionally using chain terminators, for example monophenols, and optionally using trifunctional or more than trifunctional branching agents, for example triphenols or tetraphenols. Preparation is likewise possible via a melt polymerization process through reaction of diphenols with, for example, diphenyl carbonate.

Diphenols for preparation of the aromatic polycarbonates and/or aromatic polyestercarbonates are preferably those of the formula (I)

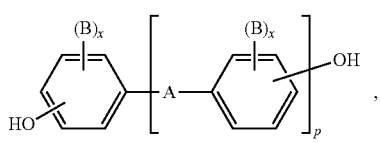

(I)

where

A is a single bond, C1 to C5-alkylene, C2 to C5-alkylidene, C5 to C6-cycloalkylidene, —O—, —SO—, —CO—, —S—, —SO2-, C6 to C12-arylene, onto which may be fused further aromatic rings optionally containing heteroatoms, or a radical of the formula (II) or (III)

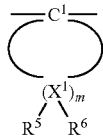

(II)

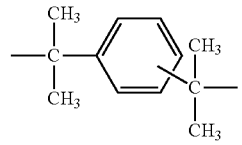

(III)

B in each case is C1 to C12-alkyl, preferably methyl, halogen, preferably chlorine and/or bromine, x in each case is independently 0, 1 or 2, p is 1 or 0, and R5 and R6 can be chosen individually for each X1 and are each independently hydrogen or C1 to C6-alkyl, preferably hydrogen, methyl or ethyl, X1 is carbon and m is an integer from 4 to 7, preferably 4 or 5, with the proviso that R5 and R6 on at least one X1 atom are simultaneously alkyl.

Preferred diphenols are hydroquinone, resorcinol, dihydroxydiphenols, bis(hydroxyphenyl)-C1-C5-alkanes, bis(hydroxyphenyl)-C5-C6-cycloalkanes, bis(hydroxyphenyl) ethers, bis(hydroxyphenyl) sulfoxides, bis(hydroxyphenyl) ketones, bis(hydroxyphenyl) sulfones and α,α-bis(hydroxyphenyl)diisopropylbenzenes, and the ring-brominated and/or ring-chlorinated derivatives thereof.

Particularly preferred diphenols are 4,4'-dihydroxydiphenyl, bisphenol A, 2,4-bis(4-hydroxyphenyl)-2-methylbutane, 1,1-bis(4-hydroxyphenyl)cyclohexane, 1,1-bis(4-hydroxyphenyl)-3,3,5-trimethylcyclohexane, 4,4'-dihydroxydiphenyl sulfide, 4,4'-dihydroxydiphenyl sulfone and the di- and tetrabrominated or chlorinated derivatives thereof, for example 2,2-bis(3-chloro-4-hydroxyphenyl)propane, 2,2-bis(3,5-dichloro-4-hydroxyphenyl)propane or 2,2-bis(3,5-dibromo-4-hydroxyphenyl)propane. 2,2-Bis(4-hydroxyphenyl)propane (bisphenol A) is especially preferred.

It is possible to use the diphenols individually or in the form of any desired mixtures. The diphenols are known from the literature or obtainable by processes known from the literature.

Examples of chain terminators suitable for the preparation of the thermoplastic aromatic polycarbonates include phenol, p-chlorophenol, p-tert-butylphenol or 2,4,6-tribromophenol, but also long-chain alkylphenols such as 4-[2-(2,4,4-trimethylpentyl)]phenol, 4-(1,3-tetramethylbutyl)phenol according to DE-A 2 842 005 or monoalkylphenol or dialkylphenols having a total of 8 to 20 carbon atoms in the alkyl substituents, such as 3,5-di-tert-butylphenol, p-isooctylphenol, p-tert-octylphenol, p-dodecylphenol and 2-(3,5-dimethylheptyl)phenol and 4-(3,5-dimethylheptyl)phenol. The amount of chain terminators to be used is generally between 0.5 mol % and 10 mol %, based on the molar sum of the diphenols used in each case.

The thermoplastic aromatic polycarbonates preferably have mean weight-average molecular weights (Mw, measured by gel permeation chromatography in methylene chloride at 25° C. with polycarbonate as standard) of 20 000 to 40 000 g/mol, preferably 22 000 to 35 000 g/mol, more preferably 24 000 to 32 000 g/mol.

The thermoplastic aromatic polycarbonates may be branched in a known manner, preferably through the incorporation of 0.05 to 2.0 mol %, based on the sum total of the diphenols used, of trifunctional or more than trifunctional compounds, for example those having three or more phenolic groups.

Both homopolycarbonates and copolycarbonates are suitable. For preparation of inventive copolycarbonates in accordance with component A, it is also possible to use 1 to 25% by weight, preferably 2.5 to 25% by weight, based on the total amount of diphenols to be used, of polydiorganosiloxanes having hydroxyaryloxy end groups. These are known (U.S. Pat. No. 3,419,634) and are preparable by processes known from the literature. The preparation of polydiorganosiloxane-containing copolycarbonates is described in DE-A 3 334 782.

Preferred polycarbonates are, as well as the bisphenol A homopolycarbonates, the copolycarbonates of bisphenol A with up to 15 mol %, based on the molar sums of diphenols, of other diphenols specified as preferred or particularly preferred, especially 2,2-bis(3,5-dibromo-4-hydroxyphenyl) propane.

Aromatic dicarbonyl dihalides for preparation of aromatic polyestercarbonates are preferably the diacid dichlorides of isophthalic acid, terephthalic acid, diphenyl ether 4,4'-dicarboxylic acid and naphthalene-2,6-dicarboxylic acid.

Particular preference is given to mixtures of the diacid dichlorides of isophthalic acid and terephthalic acid in a ratio between 1:20 and 20:1.

In the preparation of polyestercarbonates, a carbonic halide, preferably phosgene, is also additionally used as a bifunctional acid derivative.

Useful chain terminators for the preparation of the aromatic polyestercarbonates include, apart from the monophenols already mentioned, the chlorocarbonic esters thereof and the acid chlorides of aromatic monocarboxylic acids, which may optionally be substituted by C1 to C22-alkyl groups or by halogen atoms, and aliphatic C2 to C22-monocarbonyl chlorides.

The amount of chain terminators in each case is 0.1 to 10 mol %, based on moles of diphenol in the case of the phenolic chain terminators and on moles of dicarbonyl dichloride in the case of monocarbonyl chloride chain terminators.

The aromatic polyestercarbonates may also contain incorporated aromatic hydroxycarboxylic acids.

The aromatic polyestercarbonates may be either linear or branched in a known manner (see DE-A 2 940 024 and DE-A 3 007 934).

Branching agents used may, for example, be tri- or multifunctional carbonyl chlorides, such as trimesyl trichloride, cyanuric trichloride, 3,3',4,4'-benzophenonetetracarbonyl tetrachloride, 1,4,5,8-naphthalenetetracarbonyl tetrachloride or pyromellitic tetrachloride, in amounts of 0.01 to 1.0 mol % (based on dicarbonyl dichlorides used), or tri- or multifunctional phenols, such as phloroglucinol, 4,6-dimethyl-2,4,6-tri(4-hydroxyphenyl)hept-2-ene, 4,6-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenylmethane, 2,2-bis[4,4-bis(4-hydroxyphenyl)cyclohexyl]propane, 2,4-bis(4-hydroxyphenylisopropyl)phenol, tetra(4-hydroxyphenyl) methane, 2,6-bis(2-hydroxy-5-methylbenzyl)-4-methylphenol, 2-(4-hydroxyphenyl)-2-(2,4-dihydroxyphenyl)propane, tetra(4-[4-hydroxyphenylisopropyl]phenoxy)methane, 1,4-bis[4,4'-dihydroxytriphenyl)methyl]benzene, in amounts of 0.01 to 1.0 mol %, based on diphenols used. Phenolic branching agents may be initially charged together with the diphenols; acid chloride branching agents may be introduced together with the acid dichlorides.

The proportion of carbonate structural units in the thermoplastic aromatic polyestercarbonates may vary as desired. Preferably, the proportion of carbonate groups is up to 100 mol %, especially up to 80 mol %, more preferably up to 50 mol %, based on the sum total of ester groups and carbonate groups. Both the ester fraction and the carbonate fraction of the aromatic polyestercarbonates may be present in the form of blocks or in random distribution in the polycondensate.

The thermoplastic aromatic polycarbonates and polyestercarbonates may be used alone or in any desired mixture.

Component B1

Component B1 comprises graft polymers prepared in an emulsion polymerization process of, in a preferred embodiment, B1.1) 5% to 95% by weight, preferably 10% to 70% by weight, more preferably 20% to 60% by weight, based on component B1, of a mixture of B1.1.1) 65% to 85% by weight, preferably 70% to 80% by weight, based on B1.1, of at least one monomer selected from the group of the vinylaromatics (for example styrene, α-methylstyrene), ring-substituted vinylaromatics (for example p-methylstyrene, p-chlorostyrene) and (C1-C8)-alkyl methacrylates (for example methyl methacrylate, ethyl methacrylate) and B1.1.2) 15% to 35% by weight, preferably 20% to 30% by weight, based on B1.1, of at least one monomer selected from the group of the vinyl cyanides (for example unsaturated nitriles such as acrylonitrile and methacrylonitrile), (C1-C8)-alkyl(meth)acrylates (for example methyl methacrylate, n-butyl acrylate, tert-butyl acrylate) and derivatives (for example anhydrides and imides) of unsaturated carboxylic acids (for example maleic anhydride and N-phenylmaleimide)

onto

B1.2) 95% to 5% by weight, preferably 90% to 30% by weight, more preferably 80% to 40% by weight, based on component B1, of at least one elastomeric graft base.

The graft base preferably has a glass transition temperature of <0° C., further preferably <−20° C., more preferably <−60° C.

Glass transition temperatures, unless stated otherwise in the present invention, are determined by means of dynamic differential calorimetry (DSC) to the standard DIN EN 61006 at a heating rate of 10 K/min, with definition of the Tg as the midpoint temperature (tangent method), and nitrogen as protective gas.

The graft particles in component B1 preferably have a median particle size (D50) of 0.05 to 5 μm, preferably of 0.1 to 1.0 μm, more preferably of 0.2 to 0.5 μm.

The median particle size D50 is the diameter with 50% by weight of the particles above it and 50% by weight below it. It is determined, unless explicitly stated otherwise in the present application, by means of ultracentrifuge measurement (W. Scholtan, H. Lange, Kolloid, Z. and Z. Polymere [Polymers] 250 (1972), 782-1796).

Preferred monomers B1.1.1 are selected from at least one of the monomers styrene, α-methylstyrene and methyl methacrylate; preferred monomers B1.1.2 are selected from at least one of the monomers acrylonitrile, maleic anhydride and methyl methacrylate.

Particularly preferred monomers are B1.1.1 styrene and B1.1.2 acrylonitrile.

Graft bases B1.2 suitable for the graft polymers B1 are, for example, diene rubbers, diene-vinyl block copolymer rubbers, EP(D)M rubbers, i.e. those based on ethylene/propylene and optionally diene, acrylate rubbers, polyurethane rubbers, silicone rubbers, chloroprene rubbers and ethylene/vinyl acetate rubbers, and also mixtures of such rubbers or silicone-acrylate composite rubbers in which the silicone and acrylate components are chemically joined to one another (for example by grafting) to one another.

Preferred graft bases B1.2 are diene rubbers (for example based on butadiene or isoprene), diene-vinyl block copolymer rubbers (for example based on butadiene and styrene blocks), copolymers of diene rubbers with further copolymerizable monomers (for example according to B1.1.1 and B1.1.2) and mixtures of the aforementioned rubber types. Particular preference is given to pure polybutadiene rubber and styrene-butadiene block copolymer rubber.

The gel content of the graft polymers is at least 40% by weight, preferably at least 60% by weight, more preferably at least 75% by weight (measured in acetone).

The gel content of the graft polymers is, unless stated otherwise in the present invention, determined at 25° C. as the insoluble fraction in acetone as the solvent (M. Hoffmann, H. Krömer, R. Kuhn, Polymeranalytik I and II [Polymer Analysis I and II], Georg Thieme-Verlag, Stuttgart 1977).

The graft polymers B1 are prepared by free-radical polymerization.

The graft polymer B1 generally comprises, as a result of the preparation, free copolymer, i.e. copolymer not chemically bound to the rubber base, of B1.1.1 and B1.1.2, which is notable in that it can be dissolved in suitable solvents (e.g. acetone).

Preferably, component B1 contains a free copolymer of B1.1.1 and B1.1.2 which has a weight-average molecular weight (Mw), determined by gel permeation chromatography with polystyrene as standard, of preferably 30 000 to 150 000 g/mol, more preferably 40 000 to 120 000 g/mol.

Component B2

Component B2 of the compositions according to the invention may optionally comprise graft polymers prepared by the bulk, suspension or solution polymerization process. A preferred embodiment in this case comprises graft polymers of B2.1) 5% to 95% by weight, preferably 80% to 93% by weight, more preferably 85% to 92% by weight, most preferably 87% to 93% by weight, based on component B2, of a mixture of B2.1.1) 65% to 85% by weight, preferably 70% to 80% by weight, based on the mixture B.2.1, of at least one monomer selected from the group of the vinylaromatics (for example styrene, a-methylstyrene), ring-substituted vinylaromatics (for example p-methylstyrene, p-chlorostyrene) and (C1-C8)-alkyl methacrylates (for example methyl methacrylate, ethyl methacrylate) and B2.1.2) 15% to 35% by weight, preferably 20% to 30% by weight, based on the mixture B.2.1, of at least one monomer selected from the group of the vinyl cyanides (for example unsaturated nitriles such as acrylonitrile and methacrylonitrile), (C1-C8)-alkyl(meth)acrylates (for example methyl methacrylate, n-butyl acrylate, tert-butyl acrylate) and derivatives (for example anhydrides and imides) of unsaturated carboxylic acids (for example maleic anhydride and N-phenylmaleimide)

onto

B2.2) 95% to 5% by weight, preferably 20% to 7% by weight, more preferably 15% to 8% by weight, most preferably 13% to 7% by weight, based on component B2, of at least one graft base.

The graft base preferably has a glass transition temperature of <0° C., preferably <−20° C., more preferably <−60° C.

The graft particles in component B2 preferably have a median particle size (D50) of 0.1 to 10 μm, preferably of 0.2 to 2 μm, particularly preferably of 0.3 to 1.0 μm, most preferably of 0.3 to 0.6 μm.

Preferred monomers B2.1.1 are selected from at least one of the monomers styrene, α-methylstyrene and methyl methacrylate; preferred monomers B2.1.2 are selected from at least one of the monomers acrylonitrile, maleic anhydride and methyl methacrylate.

Particularly preferred monomers are B2.1.1 styrene and B2.1.2 acrylonitrile.

Graft bases B2.2 suitable for the graft polymers B2 are, for example, diene rubbers, diene-vinyl block copolymer rubbers, EP(D)M rubbers, i.e. those based on ethylene/propylene and optionally diene, acrylate rubbers, polyurethane rubbers, silicone rubbers, chloroprene rubbers and ethylene/vinyl acetate rubbers, and also mixtures of such rubbers or silicone-acrylate composite rubbers in which the silicone and acrylate components are chemically joined to one another (for example by grafting) to one another.

Preferred graft bases B2.2 are diene rubbers (for example based on butadiene or isoprene), diene-vinyl block copolymer rubbers (for example based on butadiene and styrene blocks), copolymers of diene rubbers with further copolymerizable monomers (for example according to B2.1.1 and B2.1.2) and mixtures of the aforementioned rubber types. Particularly preferred graft bases B2.2 are styrene-butadiene block copolymer rubbers and mixtures of styrene-butadiene block copolymer rubbers with pure polybutadiene rubber.

The gel content of the graft polymers B2 is preferably 10 to 35% by weight, more preferably 15 to 30% by weight, most preferably 17 to 23% by weight (measured in acetone).

Particularly preferred polymers B2 are, for example, ABS polymers prepared by free-radical polymerization, which, in a preferred embodiment, contain up to 10% by weight, more preferably up to 5% by weight, more preferably 2 to 5% by weight, based in each case on the graft polymer B2, of n-butyl acrylate.

The graft polymer B2 generally comprises, as a result of the preparation, free copolymer, i.e. copolymer not chemically bound to the rubber base, of B2.1.1 and B2.1.2, which is notable in that it can be dissolved in suitable solvents (e.g. acetone).

Preferably, component B2 contains free copolymer of B2.1.1 and B2.1.2 which has a weight-average molecular weight (Mw), determined by gel permeation chromatography with polystyrene as standard, of preferably 50 000 to 200 000 g/mol, more preferably of 70 000 to 150 000 g/mol, more preferably of 80 000 to 120 000 g/mol.

Component B3

The composition may optionally comprise, as a further component B3, (co)polymers of at least one monomer from the group of the vinylaromatics, vinyl cyanides (unsaturated nitriles), (C1 to C8)-alkyl(meth)acrylates, unsaturated carboxylic acids and derivatives (such as anhydrides and imides) of unsaturated carboxylic acids.

Especially suitable as component B3 are (co)polymers of

B3.1 50 to 99% by weight, preferably 65 to 85% by weight, more preferably 70 to 80% by weight, based on the (co) polymer B3, of at least one monomer selected from the group of the vinylaromatics (for example styrene, α-methylstyrene), ring-substituted vinylaromatics (for example p-methylstyrene, p-chlorostyrene) and (C1-C8)-alkyl(meth) acrylates (for example methyl methacrylate, n-butyl acrylate, tert-butyl acrylate) and B3.2 1 to 50% by weight, preferably 15 to 35% by weight, more preferably 20 to 30% by weight, based on the (co)

polymer B3, of at least one monomer selected from the group of the vinyl cyanides (for example unsaturated nitriles such as acrylonitrile and methacrylonitrile), (C1-C8)-alkyl (meth)acrylates (for example methyl methacrylate, n-butyl acrylate, tert-butyl acrylate), unsaturated carboxylic acids and derivatives of unsaturated carboxylic acids (for example maleic anhydride and N-phenylmaleimide).

These (co)polymers B3 are resinous, thermoplastic and rubber-free. Particular preference is given to the copolymer of B3.1 styrene and B3.2 acrylonitrile.

(Co)polymers B3 of this kind are known and can be prepared by free-radical polymerization, especially by emulsion, suspension, solution or bulk polymerization.

The (co)polymers B3 have a weight-average molecular weight (Mw), determined by gel permeation chromatography with polystyrene as standard, of preferably 50 000 to 200 000 g/mol, more preferably of 70 000 to 150 000 g/mol, more preferably of 80 000 to 130 000 g/mol.

Component C

The composition may optionally comprise other commercially available polymer additives as component C.

Useful commercial polymer additives as per component C include additives such as, for example, flame retardants (for example phosphorus or halogen compounds), flame retardant synergists (for example nanoscale metal oxides), smoke-inhibiting additives (for example boric acid or borates), antidripping agents (for example compounds from the substance classes of the fluorinated polyolefins, the silicones and aramid fibers), internal and external lubricants and demolding agents (for example pentaerythrityl tetrastearate, montan wax or polyethylene wax), flowability aids (for example low molecular weight vinyl (co)polymers), antistats (for example block copolymers of ethylene oxide and propylene oxide, other polyethers or polyhydroxy ethers, polyetheramides, polyesteramides or sulfonic salts), conductivity additives (for example conductive black or carbon nanotubes), stabilizers (for example UV/light stabilizers, thermal stabilizers, antioxidants, transesterification inhibitors, hydrolysis stabilizers), antibacterial additives (for example silver or silver salts), scratch resistance-improving additives (for example silicone oils or hard fillers such as (hollow) ceramic beads or quartz powder), IR absorbents, optical brighteners, fluorescent additives, fillers and reinforcers (e.g. talc, ground glass or carbon fibers, (hollow) glass or ceramic beads, mica, kaolin, $CaCO_3$ and glass flakes), acids, and also dyes and pigments (for example carbon black, titanium dioxide or iron oxide), or else mixtures of a plurality of the additives mentioned.

In a preferred embodiment, the inventive compositions each comprise, as component C, at least one component selected from the group of the demolding agents and stabilizers. In a particularly preferred embodiment, the demolding agent used is pentaerythrityl tetrastearate. In a particularly preferred embodiment, the stabilizer used is at least one compound selected from the group of the sterically hindered phenols, the organic phosphites and the Brønsted-acidic compounds.

As component C, the inventive compositions may especially also comprise flame retardants, for example halogenated organic compounds or phosphorus-containing flame retardants. The latter are used with preference.

Phosphorus-containing flame retardants in the sense of the invention are preferably selected from the groups of the mono- and oligomeric phosphoric and phosphonic esters, phosphonate amines and phosphazenes, and it is also possible to use mixtures of a plurality of compounds selected from one or more than one of these groups as flame retardants. It is also possible to use other halogen-free phosphorus compounds that have not been mentioned here specifically, alone or in any desired combination with other halogen-free phosphorus compounds.

Preferred mono- and oligomeric phosphoric and phosphonic esters are phosphorus compounds of the general formula (IV)

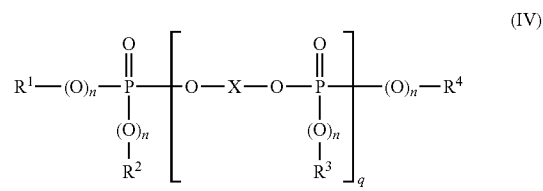

in which
R1, R2, R3 and R4 are each independently optionally halogenated C1 to C8-alkyl, in each case optionally alkyl-substituted, preferably C1 to C4-alkyl-substituted, and/or halogen-substituted, preferably chlorine- or bromine-substituted, C5 to C6-cycloalkyl, C6 to C20-aryl or C7 to C12-aralkyl,
n is independently 0 or 1,
q is 0 to 30 and
X is a mono- or polycyclic aromatic radical having 6 to 30 carbon atoms, or a linear or branched aliphatic radical having 2 to 30 carbon atoms, which may be OH-substituted and may contain up to 8 ether bonds.

Preferably, R1, R2, R3 and R4 are each independently C1 to C4-alkyl, phenyl, naphthyl or phenyl-C1-C4-alkyl. The aromatic R1, R2, R3 and R4 groups may in turn be substituted by halogen and/or alkyl groups, preferably chlorine, bromine and/or C1 to C4-alkyl. Particularly preferred aryl radicals are cresyl, phenyl, xylenyl, propylphenyl or butylphenyl, and the corresponding brominated and chlorinated derivatives thereof.

X in the formula (IV) is preferably a mono- or polycyclic aromatic radical having 6 to 30 carbon atoms. The latter preferably derives from diphenols of the formula (I).
n in the formula (IV) may independently be 0 or 1; n is preferably 1.
q represents values from 0 to 30. When mixtures of different components of the formula (IV) are used, it is possible with preference to use mixtures number-average q values of 0.3 to 10, more preferably 0.5 to 10, especially 1.05 to 1.4.
X is more preferably

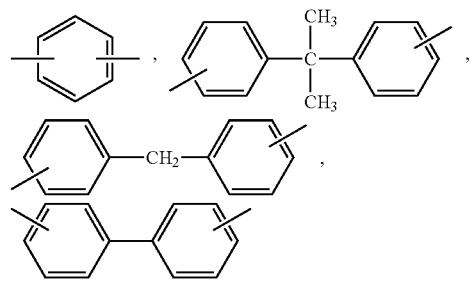

or the chlorinated or brominated derivatives thereof; more particularly, X derives from resorcinol, hydroquinone, bisphenol A or diphenylphenol. More preferably, X derives from bisphenol A.

The use of oligomeric phosphoric esters of the formula (IV) which derive from bisphenol A is particularly advantageous since the compositions modified with this phosphorus compound have a particularly high stress-cracking and hydrolysis resistance, and a particularly low tendency to form deposits in the course of processing by injection molding. In addition, it is possible with these flame retardants to achieve a particularly high heat distortion resistance.

Inventive component C used may be monophosphates (q=0), oligophosphates (q=1-30) or mixtures of mono- and oligophosphates.

Monophosphorus compounds of the formula (IV) are especially tributyl phosphate, tris(2-chloroethyl)phosphate, tris(2,3-dibromopropyl)phosphate, triphenyl phosphate, tricresyl phosphate, diphenyl cresyl phosphate, diphenyl octyl phosphate, diphenyl 2-ethylcresyl phosphate, tri(isopropylphenyl)phosphate, halogen-substituted aryl phosphates, dimethyl methylphosphonate, diphenyl methylphosphenate, diethyl phenylphosphonate, triphenylphosphine oxide or tricresylphosphine oxide.

The phosphorus compounds of the formula (IV) are known (cf., for example, EP-A 363 608, EP-A 640 655) or can be prepared in an analogous manner by known methods (e.g. Ullmanns Enzyklopadie der technischen Chemie [Ullmann's Encyclopedia of Industrial Chemistry], vol. 18, p. 301 ff. 1979; Houben-Weyl, Methoden der organischen Chemie [Methods of Organic Chemistry], vol. 12/1, p. 43; Beilstein vol. 6, p. 177).

The mean q values can be determined by using a suitable method (gas chromatography (GC), high pressure liquid chromatography (HPLC), gel permeation chromatography (GPC)) to determine the composition of the phosphate mixture (molecular weight distribution) and using this to calculate the mean values for q.

Phosphonate amines are preferably compounds of the formula (V)

$$A_{3-y}\text{-NB1}_y \quad (V)$$

in which
A is a radical of the formula (Va)

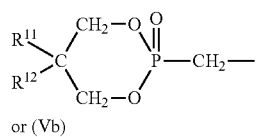

or (Vb)

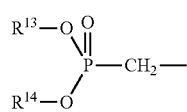

R11 and R12 are each independently unsubstituted or substituted C1-C10-alkyl or unsubstituted or substituted C6 to C10-aryl,
R13 and R14 are each independently unsubstituted or substituted C1-C10-alkyl or unsubstituted or substituted C6 to C10-aryl or
R13 and R14 together are unsubstituted or substituted C3 to C10-alkylene,
y denotes the numerical values 0, 1 or 2 and
B1 is independently hydrogen, optionally halogenated C2 to C8-alkyl, unsubstituted or substituted C6 to C10-aryl.

B1 is preferably independently hydrogen, ethyl, n- or isopropyl, which may be substituted by halogen, unsubstituted or C1 to C4-alkyl- and/or halogen-substituted C6 to C10-aryl, especially phenyl or naphthyl.
Alkyl in R11, R12, R13 and R14 is independently preferably methyl, ethyl, n-propyl, isopropyl, n-, iso-, sec- or tert-butyl, pentyl or hexyl.

Substituted alkyl in R11, R12, R13 and R14 is preferably independently halogen-substituted C1 to C10-alkyl, especially mono- or disubstituted methyl, ethyl, n-propyl, isopropyl, n-, iso-, sec- or tert-butyl, pentyl or hexyl.
C6 to C10-aryl in R11, R12, R13 and R14 is preferably independently phenyl, naphthyl or binaphthyl, especially o-phenyl, o-naphthyl, o-binaphthyl, which may be substituted by halogen (generally mono-, di- or trisubstituted).
R13 and R14 together with the oxygen atoms to which they are bonded directly and the phosphorus atom may form a ring structure.
Preferred examples include: 5,5,5',5',5'',5''-hexamethyltris (1,3,2-dioxaphosphorinanemethane)amino-2,2',2''-trioxide of the formula (Va-1)

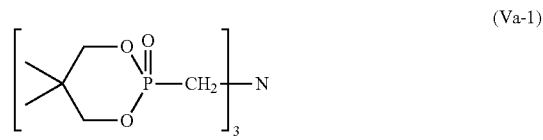

1,3,2-dioxaphosphorinane-2-methanamine, N-butyl-N[(5,5-dimethyl-1,3,2-dioxaphosphorinan-2-yl)methyl]-5,5-dimethyl-, P,2-dioxide; 1,3,2-dioxaphosphorinane-2-methanamine, N-[[5,5-dimethyl-1,3,2-dioxaphosphorinan-2-yl) methyl]-5,5-dimethyl-N-phenyl-, P,2-dioxide; 1,3,2-dioxaphosphorinane-2-methanamine, N,N-dibutyl-5,5-dimethyl-, 2-oxide, 1,3,2-dioxaphosphorinane-2-methanimine, N-[(5,5-dimethyl-1,3,2-dioxaphosphorinan-2-yl)methyl]-N-ethyl-5,5-dimethyl-, P,2-dioxide, 1,3,2-dioxaphosphorinane-2-methanamine, N-butyl-N-[(5,5-dichloromethyl-1,3,2-dioxaphosphorinan-2-yl)methyl]-5,5-dichloromethyl-, P,2-dioxide, 1,3,2-dioxaphosphorinane-2-methanamine, N-[(5,5-dichloromethyl-1,3,2-dioxaphosphorinan-2-yl)methyl]-5,5-dichloromethyl-N-phenyl-, P,2-dioxide; 1,3,2-dioxaphosphorinane-2-methanamine, N,N-di(4-chlorobutyl)-5,5-dimethyl-2-oxide; 1,3,2-dioxaphosphorinane-2-methanimine, N-[(5,5-dimethyl-1,3,2-dioxaphosphorinan-2-yl)methane]-N-(2-chloroethyl)-5,5-di(chloromethyl)-, P2-dioxide.

Preference is further given to:
compounds of the formula (Va-2) or (Va-3)

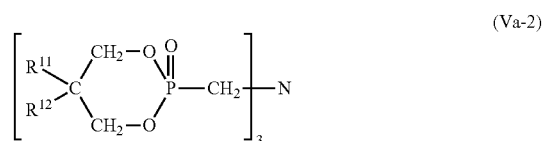

where
R11, R12, R13 and R14 are each as defined above.

Particular preference is given to compounds of the formula (Va-2) and (Va-1). The preparation of the phosphonate amines is described, for example, in U.S. Pat. No. 5,844,028.

Phosphazenes are compounds of the formulae (VIa) and (VIb)

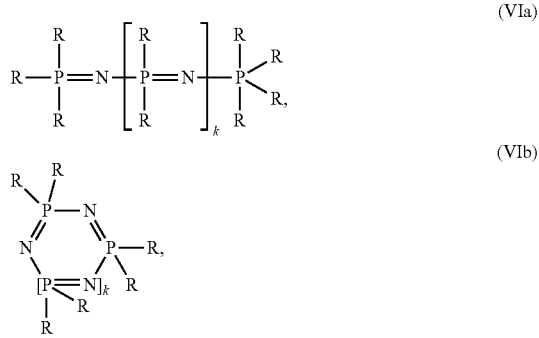

in which
R is the same or different in each case and is amino, in each case optionally halogenated, preferably fluorinated, C1 to C8-alkyl, or C1 to C8-alkoxy, in each case optionally alkyl-substituted, preferably C1 to C4-alkyl-substituted, and/or halogen-substituted, preferably chlorine- and/or bromine-substituted, C5 to C6-cycloalkyl, C6 to C20-aryl, preferably phenyl or naphthyl, C6 to C20-aryloxy, preferably phenoxy, naphthyloxy, or C7 to C12-aralkyl, preferably phenyl-C1-C4-alkyl,
k is 0 or a number from 1 to 15, preferably a number from 1 to 10.

Examples include propoxyphosphazene, phenoxyphosphazene, methylphenoxyphosphazene, aminophosphazene and fluoroalkylphosphazenes. Preference is given to phenoxyphosphazene.

The phosphazenes can be used alone or in a mixture. The R radical may always be the same, or 2 or more radicals in the formulae (VIa) and (VIb) may be different. Phosphazenes and the preparation thereof are described, for example, in EP-A 728 811, DE-A 1 961668 and WO 97/40092.

The flame retardants can be used alone or in any desired mixture with one another, or in a mixture with other flame retardants.

In addition, flame-retardant compositions, in a preferred embodiment, comprise the aforementioned flame retardants in combination with at least one antidripping agent selected from the substance classes of the fluorinated polyolefins, the silicones and aramid fibers. Particular preference is given to using polytetrafluoroethylene polymers as antidripping agents.

The molding compositions produced by the process according to the invention may be used for producing shaped bodies of any kind. These can be produced by injection molding, extrusion and blow-molding processes. A further form of processing is the production of shaped bodies by thermoforming from previously produced sheets or films.

Examples of shaped bodies of this kind are films, profiles, all kinds of housing parts, for example for domestic appliances such as juice presses, coffee machines, mixers; for office equipment such as monitors, flatscreens, notebooks, printers, copiers; sheets, tubes, electrical installation ducts, windows, doors and further profiles for the construction sector (interior fitting and exterior applications), and also electrical and electronic parts such as switches, plugs and sockets, and also bodywork and interior components for utility vehicles, especially for the automotive sector.

More particularly, the molding compositions produced by the process according to the invention can also be used, for example, for production of the following moldings or molded parts: interior fitting components for rail vehicles, ships, aircraft, buses and other motor vehicles, housing for electrical appliances containing small-scale transformers, housing for information processing and transmission devices, housing and lining for medical appliances, massage appliances and housing therefor, children's toy vehicles, flat wall elements, housing for safety devices, thermally insulated transport containers, moldings for sanitary and bathroom equipment, cover grids for blower vents and housing for garden appliances.

The molding compositions produced by the process according to the invention are also particularly suitable for preparing moldings or molded parts having class A surface requirements and high-gloss finish, which optionally have been subjected partially or fully to a further surface treatment step, for example, by lacquering, in-mold coating of foils, metallization via vacuum depositing or electroplating.

In the context of the present invention, "high-gloss" is understood to mean a gloss level determined by reflection in accordance with DIN 67530 at a measuring angle of 60° of at least 95, preferably of at least 97, particularly preferably of at least 99. The invention therefore also relates to shaped bodies or moldings formed from the compositions according to the invention having a full or partial high-gloss finish, which optionally have been subjected partly or fully to a further surface treatment step, for example, by painting, in-mold coating of films, metallization via vacuum depositing or electroplating.

The invention therefore also relates to shaped bodies or moldings formed from the compositions produced by the process according to the invention having a full or partial high-gloss finish, which optionally have been subjected partially or fully to a further surface treatment step, for example, by painting, in-mold coating of films, metallization via vacuum depositing or electroplating.

EXAMPLES

Component A1
Linear polycarbonate based on bisphenol A having a weight-average molecular weight $M_w$ of 28 kg/mol (determined by GPC in methylene chloride at 25° C. with polycarbonate as standard).

Component B1
Pre-compound, in the form of pellets, composed of 50% by weight of a graft polymer of the ABS type, prepared by the emulsion polymerization process, having an A:B:S ratio of 12:50:38% by weight and 50% by weight of a styrene-acrylonitrile copolymer, prepared by the bulk polymerization process, having a styrene-acrylonitrile ratio of 76:24% by weight and having a weight-average molecular weight $M_w$ of 100 kg/mol, measured by GPC in dimethylformamide at 20° C. with polystyrene as standard. Component B1 contains, as a result of production, 900 mg/kg of the magnesium sulfate precipitant used in the coagulation of the graft polymer. This magnesium sulfate, according to detection by scanning electron microscopy (SEM) coupled to energy-dispersive x-ray spectroscopy (EDX), is in crystalline domains having a dimension of in some cases up to more than 100 μm.

The magnesium sulfate content in component B1 was determined via a quantitative determination of the sulfate ion content and by conversion thereof to magnesium sulfate, since determination from the magnesium content is not possible because of lack of selectivity for $MgSO_4$. For this purpose, about 1 g of component B1 was weighed in accurately, admixed with 25 mL of acetone, p.A., and the mixture was treated in an ultrasound bath for 30 minutes. The suspension formed was made up to 200 mL with Millipore water and shaken thoroughly. The suspension thus treated was membrane-filtered. The sulfate ion content was determined in the filtrate by ion chromatography using a DIONEX DX 600 ion chromatograph (from DIONEX) (separating column: IonPac AS 11, 4×250 mm (from DIONEX); mobile phase: NaOH gradient, c=0.004/0.076 mol/L; flow rate: 1.8 ml/min; autosampler temperature: 23° C.; column temperature: 35° C.; suppression: electrochemical, ASRS 300, 4 mm; detection: conductivity).

Component B2 n-Butyl acrylate-modified graft polymer of the ABS type, prepared by the bulk polymerization process, having an A:B:S ratio of 21:10:65% by weight and an n-butyl acrylate content of 4% by weight. The D50 of the graft particle diameters determined by ultracentrifugation is 0.5 µm. The parent graft base of the graft polymer is a styrene-butadiene block copolymer rubber (SBR). The gel content of the graft polymer measured in acetone is 20% by weight. The weight-average molecular weight $M_w$, measured by GPC with polystyrene as standard in dimethylformamide at 20° C., of the free n-butyl acrylate-modified SAN, i.e. not chemically bound to the rubber or included in the rubber particles in acetone-insoluble form, is 110 kg/mol.

Component B3

Styrene-acrylonitrile copolymer, prepared by the bulk polymerization process, having a styrene-acrylonitrile ratio of 76:24% by weight and having a weight-average molecular weight $M_w$ of 100 kg/mol, measured by GPC in dimethylformamide at 20° C. with polystyrene as standard.

Component C1

Pentaerythrityl tetrastearate as lubricant/mold release agent

Component C2

Phosphorous ester of bis(2-hydroxy-3-cyclohexyl-5-methylphenyl) methane with the formula

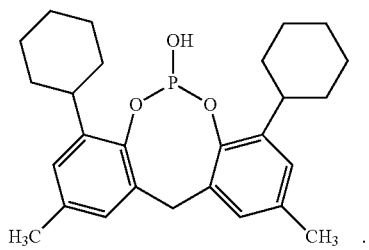 [SMILES: Cc1cc2c(c(C3CCCCC3)c1)OP(O)Oc1c(cc(C)cc1C1CCCCC1)C2]

Component C3

Thermal stabilizer, Irganox 1076, BASF (Ludwigshafen, Germany)

The compositions of the examples and comparative examples C1, 2, 3, 4, 5, 6, 7, 8, 9 and 10 listed in table 1 all contain 60.35 parts by weight of component A1

23.16 parts by weight of component B1

8.90 parts by weight of component B2

6.53 parts by weight of component B3

0.74 part by weight of component C1

0.12 part by weight of component C2

0.20 part by weight of component C3 and differ exclusively in the process used for production.

Production of the Compositions and Testing

The compositions C1, 2, 3, 4, 5, 6, 7, 8, 9 and 10 were produced in a Coperion ZSK25WLE twin-shaft extruder having a ratio of length to diameter L/D=48 at a melt temperature of 260 to 270° C. and with vacuum devolatilization at a pressure of 70 mbar (absolute).

Component B1 was used firstly in untreated form (C1), and secondly moistened by being placed into water for 30 seconds (2-10). The moistening took place in a water-filled vessel at 25° C. The moistened pellets were subsequently screened off and stored in surface-moist form in a bag for a given period of time. In examples 2 and 6, the pellets, after the storage, were used in surface-wetted form in the final compounding step. In examples 3, 4, 7, 8, 9 and 10, the pellets were then dried in an air circulation drying cabinet at 50° C. for a particular period of time. In example 5, the pellets, after the storage, were then dried on a metal sheet at 25° C. for 72 h. Details of the storage and of the aftertreatment of the pellets can be found in table 1. In the cases where the pellets were dried after storage, the pellets were used in surface-dry form and were also used as such in the final compounding step.

The pellets resulting from the respective compounding operations were processed in an injection molding machine (from Arburg) at melt temperatures of 260° C. and a mold temperature of 80° C. to give sheets of dimension 150 mm×105 mm×2 mm. In this case, a high-gloss polishing tool was used. These sheets were exposed to an air atmosphere having a relative air humidity of 95% at 40° C. for 3 days. Thereafter, a visual assessment was made by 3 independent assessors according to the following assessment basis:

++ no blisters at all or only isolated, very small blisters

+ a few very small blisters, not to a disruptive level

− many very small blisters and/or only isolated larger blisters

−− many comparatively large blisters

TABLE 1

| Process | Examples | | | | | | | | | |
| --- | --- | --- | --- | --- | --- | --- | --- | --- | --- | --- |
| | C1 | 2 | 3 | 4 | 5 | 6 | 7 | 8 | 9 | 10 |
| Inventive | — | x | x | x | x | x | x | x | x | x |
| Brief moistening in water (30 s at 25° C.) | — | x | x | x | x | x | x | x | x | x |
| Storage of the moist pellet | — | x | x | x | x | x | x | x | x | x |

TABLE 1-continued

| Process | Examples | | | | | | | | | |
|---|---|---|---|---|---|---|---|---|---|---|
| | C1 | 2 | 3 | 4 | 5 | 6 | 7 | 8 | 9 | 10 |
| Storage temperature [° C.] | — | 25 | 25 | 25 | 25 | 25 | 25 | 25 | 25 | 25 |
| Duration of storage [h] | — | 24 | 24 | 24 | 24 | 72 | 72 | 72 | 72 | 72 |
| Aftertreatment in an air circulation oven | — | — | x | x | — | — | x | x | x | x |
| Aftertreatment Drying on metal sheet | — | — | — | — | x | — | — | — | — | — |
| Aftertreatment temperature [° C.] | — | — | 50 | 50 | 25 | — | 50 | 50 | 50 | 50 |
| Duration of aftertreatment [h] | — | — | 0.25 | 4 | 72 | — | 0.08 | 0.25 | 1 | 4 |
| Properties | — | — | — | — | — | — | — | — | — | — |
| Visual assessment | −/−− | − | − | + | + | + | + | + | + | + |

The invention claimed is:

1. A process for producing a composition comprising
A) 0 to 98 parts by weight, based on the sum total of A and B, of a thermoplastic polymer or a mixture of a plurality of thermoplastic polymers different from B and
B) 2 to 100 parts by weight, based on the sum total of A and B, of
   B1) at least one graft polymer prepared in an emulsion polymerization process,
   B2) optionally at least one graft polymer prepared by the bulk, suspension or solution polymerization process,
   B3) optionally at least one rubber-free vinyl (co)polymer and
C) 0 to 30 parts by weight, based on the sum total of A and B, of at least one commercially available polymer additive,
where the sum total of parts by weight A and B is 100,
component B, comprises at least one inorganic salt consisting of a cation selected from the group of the alkali metals, alkaline earth metals and aluminum and an anion selected from the group consisting of chloride, sulfate, nitrate, phosphate, acetate and formate, in a concentration of the salt or salt mixture of 100 to 5000 mg/kg based on the composition, and
wherein
a) in a first process step the entirety of the component(s) containing the salt from B, optionally together with a portion or the entirety of the remaining components from B, A and C is processed in a compounding system, preferably an extruder, to give a polymer blend melt, then this polymer melt is discharged from the extruder and, in the form of polymer strands prior to pelletization or alternatively in the form of pellets after the pelletization, is contacted with water completely by contact with liquid water in a water bath, a water-filled pipe system or a dip bath,
b) in a second process step the pellets which have been contacted with water in this way are separated from water not adhering to the surface of the pellets and then are stored under surface-moist conditions,
c) in a third process step the pellets thus stored under moist conditions are melted and kneaded in the molten state and/or
d) in a fourth process step the component thus prepared is mixed with the remaining components of the composition, the mixture is melted again and kneaded, and the components of the mixture are interdispersed in this way,
where a reduced pressure is applied at least in one of steps c) and d) and, in this way, the water introduced into the process in process step a) is removed again from the product, and where the mean storage time of the surface-moist pellets in step b) is at least 24 h.

2. The process as claimed in claim 1, wherein component B1 contains
   B1.1) 5% to 95% by weight, based on component B1, of a mixture of
      B1.1.1) 65% to 85% by weight, based on B1.1, of at least one monomer selected from the group consisting of styrene, a-methylstyrene and methyl methacrylate, and
      B1.1.2) 15% to 35% by weight, based on B1.1, of at least one monomer selected from the group consisting of acrylonitrile, maleic anhydride and methyl methacrylate,
   and
   B1.2) 95% to 5% by weight, based on component B1, of at least one elastomeric graft base.

3. The process as claimed in claim 1, wherein component B1 contains the inorganic salt as a production-related impurity.

4. The process as claimed in claim 1, wherein the residence time of the strands or the pellets in the water bath in process step a) is between 1 second and 60 minutes.

5. The process as claimed in claim 1, wherein the contacting with liquid water in process step a) is effected within the temperature range from 5 to 95° C.

6. The process as claimed in claim 1, wherein the amount of water in the surface-moist pellets is at least 1% by weight and at most 30% by weight, based on the sum total of water and pellets.

7. The process as claimed in claim 1, wherein process step b) is conducted continuously.

8. The process as claimed in claim 1, wherein process step b) is conducted batchwise.

9. The process as claimed in claim 1, wherein the storage time in process step b) is at least 24 h.

10. The process as claimed in claim 1, wherein the storage according to process step b) is followed downstream by a further process step for removing the surface water from the pellets discharged.

11. The process as claimed in claim 1, wherein the contacting with liquid water in process step a) and storage of the moist pellets in process step b) takes place within a temperature range from 5° C. to 95° C.

12. The process as claimed in claim 1, wherein the component(s) B containing the salt are in the form of pellets.

13. The process as claimed in claim 1, wherein the compositions comprise
   A) 30 to 85 parts by weight, based on the sum total of A and B,
   B) 15 to 70 parts by weight, based on the sum total of A and B,
   C) 0.3 to 7 parts by weight, based on the sum total of A and B.

14. The process as claimed in claim 1, wherein the salt is an alkali metal chloride, alkaline earth metal chloride or aluminum chloride or an alkali metal sulfate, alkaline earth metal sulfate or aluminum sulfate, preferably magnesium sulfate, or a mixture thereof.

15. The process as claimed in claim 1, wherein the composition comprises, as component C, at least one representative selected from the group consisting of flame retardants, flame retardant synergists, smoke-inhibiting additives, antidripping agents, internal and external lubricants and demolding agents, flowability aids, antistats, conductivity additives, UV stabilizers, light stabilizers, thermal stabilizers, antioxidants, transesterification inhibitors, hydrolysis stabilizers, antibacterial additives, scratch resistance-improving additives, IR absorbents, optical brighteners, fluorescent additives, fillers and reinforcers, acids, and dyes and pigments.

16. A composition produced by a process as claimed in claim 1.

17. A shaped body or molding composed of a polymer composition produced by a process as claimed in claim 1 having a class A surface and a partial or full high-gloss finish, characterized by a gloss level in said high-gloss regions of at least 95, determined by reflection in accordance with DIN 67530 at a measuring angle of 60°, which may optionally have been subjected partly or fully to a further surface treatment step.

18. The shaped body or molding as claimed in claim 17 which, after treatment under warm and moist conditions, does not have any blisters having a diameter of greater than 300 μm and having a relative area of defects having blister topography based on the surface size studied ($A_{rel}$) less than 50 ppm.

19. The process as claimed in claim 1, wherein the concentration of the salt or salt mixture is 150 to 2000 mg/kg, based on the composition, wherein the reduced pressure is at least 500 mbar, wherein the residence time of the strands or the pellets in the water bath in process step a) is between 2 seconds and 10 minutes, wherein the contacting with liquid water in process step a) is effected within the temperature range from 10 to 90° C., wherein the storage time in process step b) is at least 48 h, and wherein the contacting with liquid water in process step a) and storage of the moist pellets in process step b) takes place within a temperature range from 10° C. to 90° C.

20. The process as claimed in claim 1, wherein the concentration of the salt or salt mixture is 200 to 1000 mg/kg, based on the composition, wherein the reduced pressure is at least 800 mbar, wherein the residence time of the strands or the pellets in the water bath in process step a) is between 3 seconds and 60 seconds, wherein the contacting with liquid water in process step a) is effected within the temperature range from 20 to 85° C., wherein the storage time in process step b) is at least 72 h, and wherein the contacting with liquid water in process step a) and storage of the moist pellets in process step b) takes place within a temperature range from 20° C. to 85° C.

21. The process as claimed in claim 1, wherein component B1 comprises at least one inorganic salt consisting of a cation selected from the group of the alkali metals, alkaline earth metals and aluminum and an anion selected from the group consisting of chloride, sulfate, nitrate, phosphate, acetate and formate, in a concentration of the salt or salt mixture of 100 to 5000 mg/kg based on the composition.

22. The process as claimed in claim 1, wherein a precompound composed of component B1 with at least one of components B2 and B3 or with a portion of at least one of components B2 and B3 comprises at least one inorganic salt consisting of a cation selected from the group of the alkali metals, alkaline earth metals and aluminum and an anion selected from the group consisting of chloride, sulfate, nitrate, phosphate, acetate and formate, in a concentration of the salt or salt mixture of 100 to 5000 mg/kg based on the composition.

23. The process as claimed in claim 1, wherein a precompound composed of component B1 and the entirety or a portion of component B3 comprises at least one inorganic salt consisting of a cation selected from the group of the alkali metals, alkaline earth metals and aluminum and an anion selected from the group consisting of chloride, sulfate, nitrate, phosphate, acetate and formate, in a concentration of the salt or salt mixture of 100 to 5000 mg/kg based on the composition.

24. The process as claimed in claim 2, wherein the at least one elastomeric graft base B1.2) 95% to 5% by weight, based on component B1, of at least one elastomeric graft base selected from the group consisting of polybutadiene rubber and styrene-butadiene block copolymer rubber.

25. The shaped body or molding as claimed in claim 17, wherein the partial or full high-gloss finish is produced by painting, in-mold coating of films, metallization via vacuum deposition, or electroplating.

* * * * *